(12) United States Patent
Inamoto et al.

(10) Patent No.: US 10,583,864 B2
(45) Date of Patent: Mar. 10, 2020

(54) VEHICLE BODY FRAME STRUCTURE

(71) Applicant: TOYOTA JIDOSHA KABUSHIKI KAISHA, Toyota-shi, Aichi-ken (JP)

(72) Inventors: Yoshiteru Inamoto, Toyota (JP); Toshiaki Nakajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/166,717

(22) Filed: Oct. 22, 2018

(65) Prior Publication Data
US 2019/0144043 A1 May 16, 2019

(30) Foreign Application Priority Data
Nov. 15, 2017 (JP) .................. 2017-220317

(51) Int. Cl.
*B62D 25/02* (2006.01)
*B62D 25/04* (2006.01)
*B62D 25/06* (2006.01)
*B62D 27/02* (2006.01)
*B62D 29/00* (2006.01)

(52) U.S. Cl.
CPC ............ *B62D 25/06* (2013.01); *B62D 25/02* (2013.01); *B62D 25/04* (2013.01); *B62D 27/02* (2013.01); *B62D 29/007* (2013.01)

(58) Field of Classification Search
CPC ...... B62D 25/02; B62D 25/025; B62D 25/04; B62D 25/06; B62D 27/02; B62D 27/023
USPC ............ 296/187.12, 187.13, 193.05, 193.06, 296/193.12, 203.03, 29
See application file for complete search history.

(56) References Cited

U.S. PATENT DOCUMENTS

| | | | |
|---|---|---|---|
| 2009/0174228 A1* | 7/2009 | Duguet .................. | B62D 25/04 296/214 |
| 2012/0153676 A1* | 6/2012 | Shono ..................... | B62D 25/04 296/193.06 |
| 2013/0320716 A1* | 12/2013 | Nishimura ............. | B62D 25/04 296/210 |
| 2014/0354012 A1* | 12/2014 | Nagai .................. | B62D 27/023 296/193.06 |
| 2016/0107701 A1* | 4/2016 | Anegawa ............. | B62D 27/023 296/193.06 |
| 2016/0214649 A1* | 7/2016 | Emura ................... | B62D 25/04 |
| 2016/0288841 A1* | 10/2016 | Nakanishi ............. | B62D 25/04 |
| 2017/0101133 A1* | 4/2017 | Emura ................... | B62D 25/04 |
| 2017/0305470 A1 | 10/2017 | Sato et al. | |
| 2018/0148102 A1* | 5/2018 | Sato ....................... | B62D 25/04 |
| 2019/0106156 A1* | 4/2019 | Piper ...................... | B62D 25/06 |

(Continued)

FOREIGN PATENT DOCUMENTS

JP 2017-039332 A 2/2017

*Primary Examiner* — Gregory A Blankenship
(74) *Attorney, Agent, or Firm* — Oliff PLC

(57) ABSTRACT

A body frame structure that constitutes a side and a top of a vehicle includes: a pillar inner that extends in a vehicle vertical direction on the side of the vehicle; and a rail inner that extends along a boundary line between the side and the top of the vehicle. In an overlapping portion with the pillar inner, the rail inner is formed with a rail bead that is projected to a vehicle outer side. In an overlapping portion with the rail bead, the pillar inner is formed with a pillar bead in such a shape that offsets the rail bead to the vehicle outer side so that the pillar bead is located in a recess of the rail bead.

6 Claims, 5 Drawing Sheets

(56) References Cited

U.S. PATENT DOCUMENTS

| | | | |
|---|---|---|---|
| 2019/0144043 A1* | 5/2019 | Inamoto | B62D 25/04 |
| | | | 296/193.06 |
| 2019/0225277 A1* | 7/2019 | Chiba | B62D 25/02 |
| 2019/0225278 A1* | 7/2019 | Chiba | B60J 7/043 |

* cited by examiner

VEHICLE BODY FRAME STRUCTURE

CROSS REFERENCE TO RELATED APPLICATION

The entire disclosure of Japanese Patent Application No. 2017-220317 filed on Nov. 15, 2017, including the specification, claims, drawings, and abstract is incorporated herein by reference in its entirety.

TECHNICAL FIELD

The present specification discloses a body frame structure that constitutes a side and a top of a vehicle.

BACKGROUND

A vehicle is generally provided with pillars and rails as parts of a body frame structure. In general, the rails each extend along a boundary line between a side and a top of the vehicle and have: a rail inner that is disposed on a vehicle inner side; a rail reinforcement that reinforces the rail inner; and the like. Note that the reinforcement will hereinafter be abbreviated as "R/F". Meanwhile, the pillars each extend in a vertical direction of the vehicle and have: a pillar inner that is disposed on the vehicle inner side; a pillar R/F that reinforces the pillar inner; and the like.

An upper end of each of such pillars is joined to the rail. As this joining method, various joining methods are considered. For example, Patent Literature 1 discloses a joining mode in which a portion near an upper end of a center pillar outer reinforcement (a pillar outer R/F) is fixed to a roof rail outer reinforcement (a rail outer R/F) by spot welding, and a portion near an upper end of a center pillar inner (the pillar inner) is held and fixed between the roof rail outer reinforcement (the rail outer R/F) and a roof rail inner (the rail inner).

CITATION LIST

PATENT LITERATURE 1: JP 2017-039332 A

SUMMARY

Technical Problem

In recent years, it has been proposed to reduce thickness of each of the inners and inner RIFs for the purposes of further reductions in vehicle weight and cost. However, when the thickness of each of these components is reduced, the pillar or the rail is likely to be bent due to a roof crush load. In particular, a joined portion between the pillar and the rail has reduced strength, and stress is likely to be concentrated thereon. Thus, the joined portion is likely to be bent by the roof crush load.

In view of the above, the present specification discloses a vehicle body frame structure capable of preventing a pillar and a rail from being bent even when thickness thereof is reduced.

Solution to Problem

A body frame structure disclosed in the present specification is a body frame structure that constitutes a side and a top of a vehicle, and includes: a pillar inner that extends in a vehicle vertical direction on the side of the vehicle; and a rail inner that extends along a boundary line between the side and the top of the vehicle, the rail inner being disposed on a vehicle inner side of the pillar inner. In an overlapping portion with the pillar inner, the rail inner is formed with a rail bead that extends upward in the vehicle from a lower end thereof, is projected to the vehicle inner side, and is recessed to a vehicle outer side. In an overlapping portion with the rail bead, the pillar inner is formed with a pillar bead that extends in the vehicle vertical direction, the pillar bead being in such a shape that offsets the rail bead to the vehicle outer side so that the pillar bead is located in a recess of the rail bead.

With such a configuration, the deep bead can be formed in both of the pillar inner and the rail inner while an increase in thickness of a coupled portion between the pillar and the rail is suppressed. In this way, strength of the pillar inner and the rail inner can be improved. Thus, even when thickness of both of the inners is reduced, bending of the pillar and the rail can be prevented.

In this case, two or more of each of the rail beads and the pillar beads may be formed with a space being interposed therebetween in a vehicle front-rear direction.

With such a configuration, the strength of the pillar inner and the rail inner can further be improved.

Furthermore, the body frame structure includes: a roof R/F that extends in a vehicle width direction at the top of the vehicle; and a roof R/F gusset that is joined to a longitudinal end of the roof R/F and that is joined to the rail inner at a position on the vehicle inner side of the rail inner. The rail bead may be eliminated at a reference height that is slightly lower than a lower end of the roof R/F gusset, and a portion of the rail inner that overlaps the roof R/F gusset may have a flat surface without a projection and a recess.

When the portion of the rail inner that overlaps the roof R/F gusset has the flat surface, a joined portion between the roof R/F gusset and the rail inner can be secured.

A projected/recessed direction of the pillar bead may be reversed in an intermediate portion thereof such that the pillar bead is projected to the vehicle outer side and recessed to the vehicle inner side in an area above the reference height and is projected to the vehicle inner side and recessed to the vehicle outer side in an area below the reference height.

With such a configuration, while interference between the rail inner and the pillar inner is avoided in the area above the reference height, the pillar bead can extend to an upper end of the pillar inner. Thus, the strength of the pillar inner can further be improved.

The roof R/F gusset may have: a roof bead that extends upward from the lower end of the roof R/F gusset, is projected to the vehicle inner side, and is recessed to the vehicle outer side; and a flat surface that is located on each side of the roof bead and is joined to the rail inner.

By providing the roof bead and the flat surface in the roof R/F gusset, a joined point thereof with the rail inner can be secured while strength of the roof R/F gusset is increased.

The pillar inner may be a part of a center pillar that is located between a front seat and a rear seat.

By adopting the above-described configuration for the center pillar that is most likely to receive a roof crush load, a vehicle cabin can further be reliably protected when receiving the roof crush load.

Advantageous Effects of Invention

According to the body frame structure that is disclosed in the present specification, the deep bead can be formed in both of the pillar inner and the rail inner while the increase in the thickness of the coupled portion between the pillar and the rail is suppressed. In this way, the strength of the pillar inner and the rail inner can be improved. Thus, even when the thickness of both of the inners is reduced, bending of the pillar and the rail can be prevented.

BRIEF DESCRIPTION OF DRAWINGS

Embodiment(s) of the present disclosure will be described based on the following figures, wherein.

DESCRIPTION OF EMBODIMENTS

Figure 1:
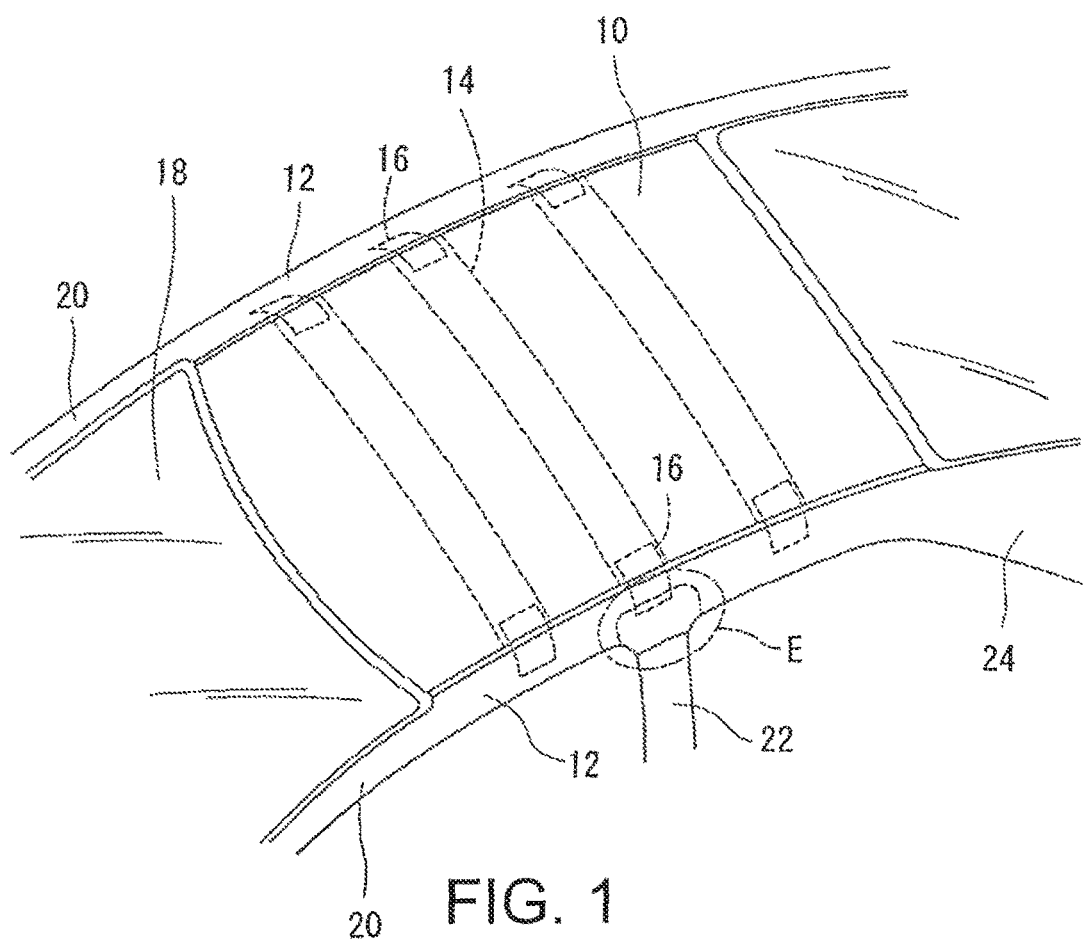
FIG. 1 is a perspective view in which a vehicle is seen in an obliquely downward direction.

A description will hereinafter be given of a body frame structure that constitutes a side and a top of a vehicle, with reference to the drawings. FIG. 1 is a perspective view in which the vehicle is seen in an obliquely downward direction. As illustrated in FIG. 1, a roof panel 10 that is made of metal such as a steel sheet is provided at the top of the vehicle. At each end of this roof panel 10 in a vehicle width direction, a rail 12 is provided to extend along a boundary line between the top and the side of the vehicle.

A roof R/F 14 that supports the roof panel 10 stretches between the two rails 12. In FIG. 1, only three roof R/Fs 14 are illustrated. However, the roof R/Fs 14 numbering more than three are actually provided at the top of the vehicle. Each longitudinal end of this roof R/F 14 is joined to the rail 12 via a roof R/F gusset 16 that is made of metal such as the steel sheet.

Three types of pillars 20, 22, 24 are disposed on each of the sides of the vehicle. The A pillar 20 (a front pillar) is disposed at each end of a windshield 18, and an upper end thereof is joined to a front end of the rail 12. The B pillar 22 (a center pillar) is disposed between a front seat and a rear seat, and an upper end thereof is joined substantially to a center of the rail 12. A position of this B pillar 22 in a front-rear direction matches a position of one of the roof R/Fs 14 in the front-rear direction, and an upper end of the B pillar 22 is located in proximity to the roof R/F gusset 16. The C pillar 24 (a rear pillar) is disposed slightly at the rear of the rear seat, and an upper end thereof is joined to a rear end of the rail 12.

Here, in the case where the vehicle overturns, a load in a direction from the top toward a bottom of the vehicle, a so-called roof crush load, is generated. In general, such a roof crush load is applied most to the B pillar 22. Thus, in order to protect a vehicle cabin against the roof crush load, it is desired that the B pillar 22 is not bent even when receiving the roof crush load. In particular, a coupled portion between the B pillar 22 and the rail 12 (hereinafter referred to as a "pillar/rail coupled portion E") is likely to have reduced strength, and stress is likely to be concentrated thereon. Accordingly, in order to reliably protect the vehicle cabin against the roof crush load, it is desired to secure the sufficient strength in the pillar/rail coupled portion E.

In recent years, it has been desired to reduce thickness of sheet metal members (a pillar inner 40, a rail inner 30, and the like, which will be described below) that constitute the B pillar 22 and the rail 12 for the purposes of further reductions in weight and cost. However, in the case where the thickness of each of the sheet metal members is reduced, bending and the like of the B pillar 22 are more likely to occur in the pillar/rail coupled portion E, the strength of which is naturally and likely to be reduced.

In view of the above, in order to improve the strength of the pillar/rail coupled portion E in the body frame structure disclosed in the present specification, the pillar inner 40 as a part of the B pillar 22 and the rail inner 30 as a part of the rail 12 each have a special structure. A detailed description will hereinafter be made thereon.

Figure 2:
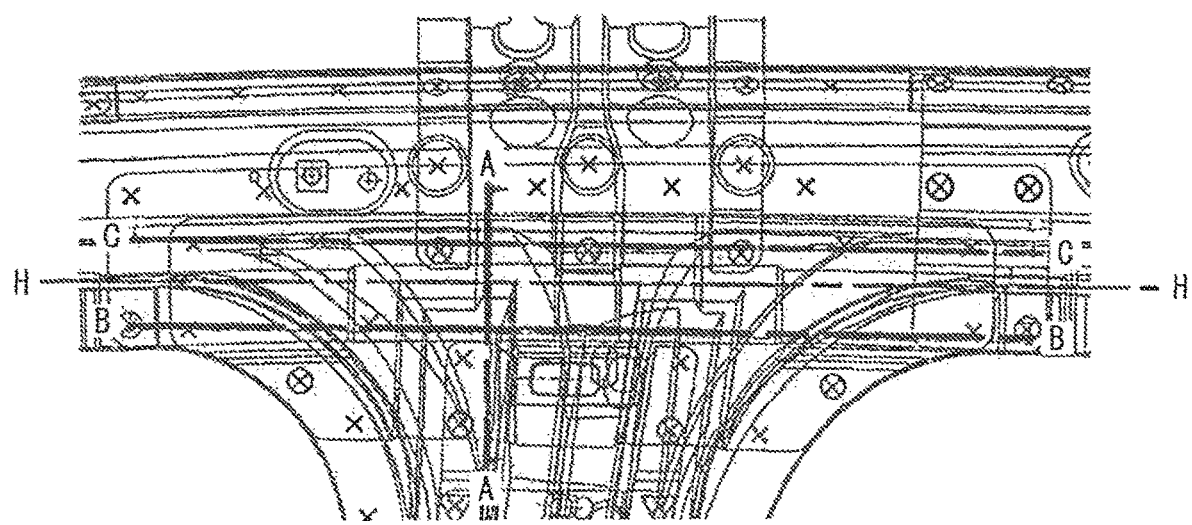
FIG. 2 is a view in which outlines of sheet metal members disposed in a pillar/rail coupled portion overlap each other.
Figure 3:
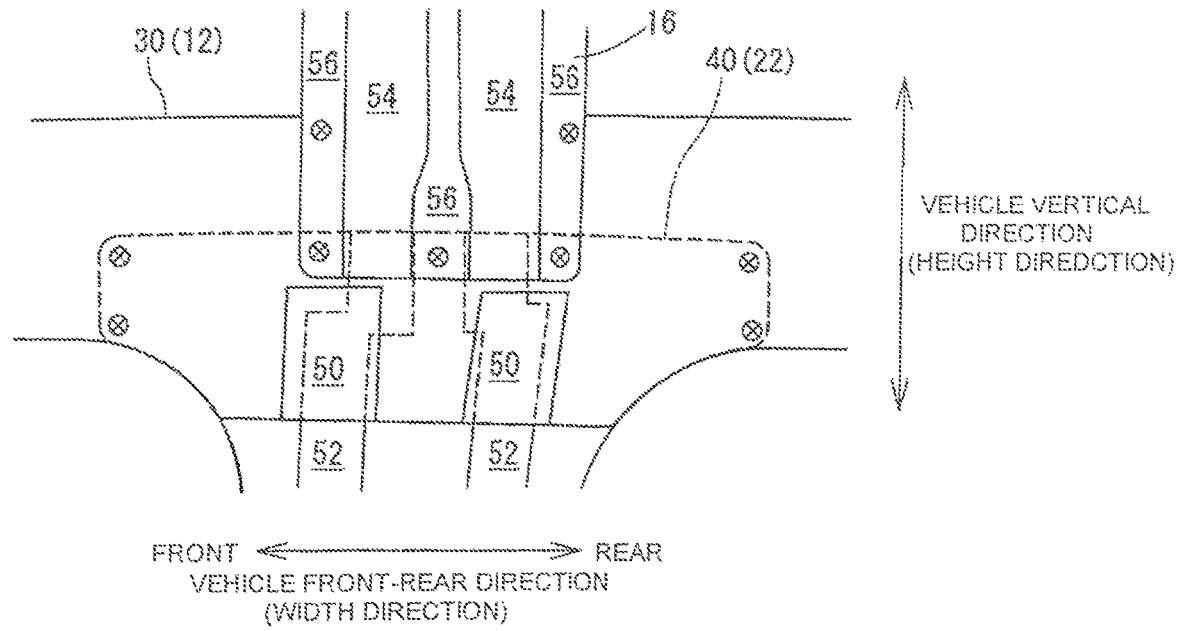
FIG. 3 is a view in which the pillar/rail coupled portion is seen from a vehicle inner side.
Figure 4:
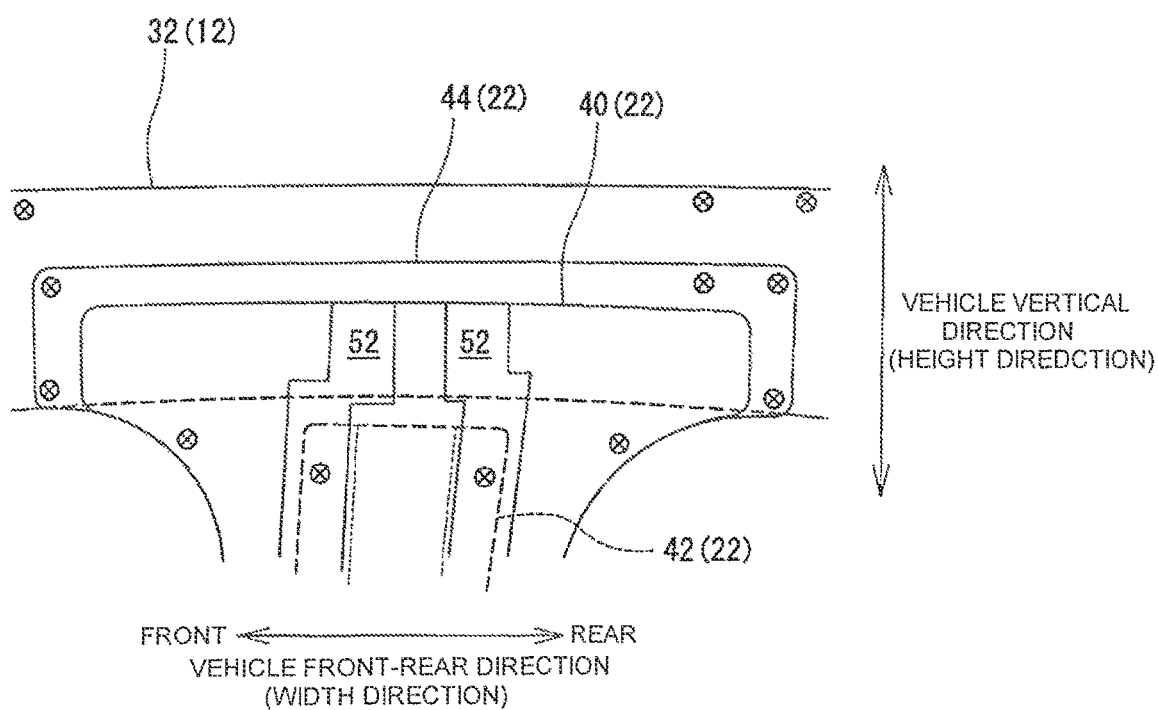
FIG. 4 is a view in which the pillar/rail coupled portion is seen from the vehicle inner side and is a view of a state where a roof R/F gusset and a rail inner are removed.
Figure 5:
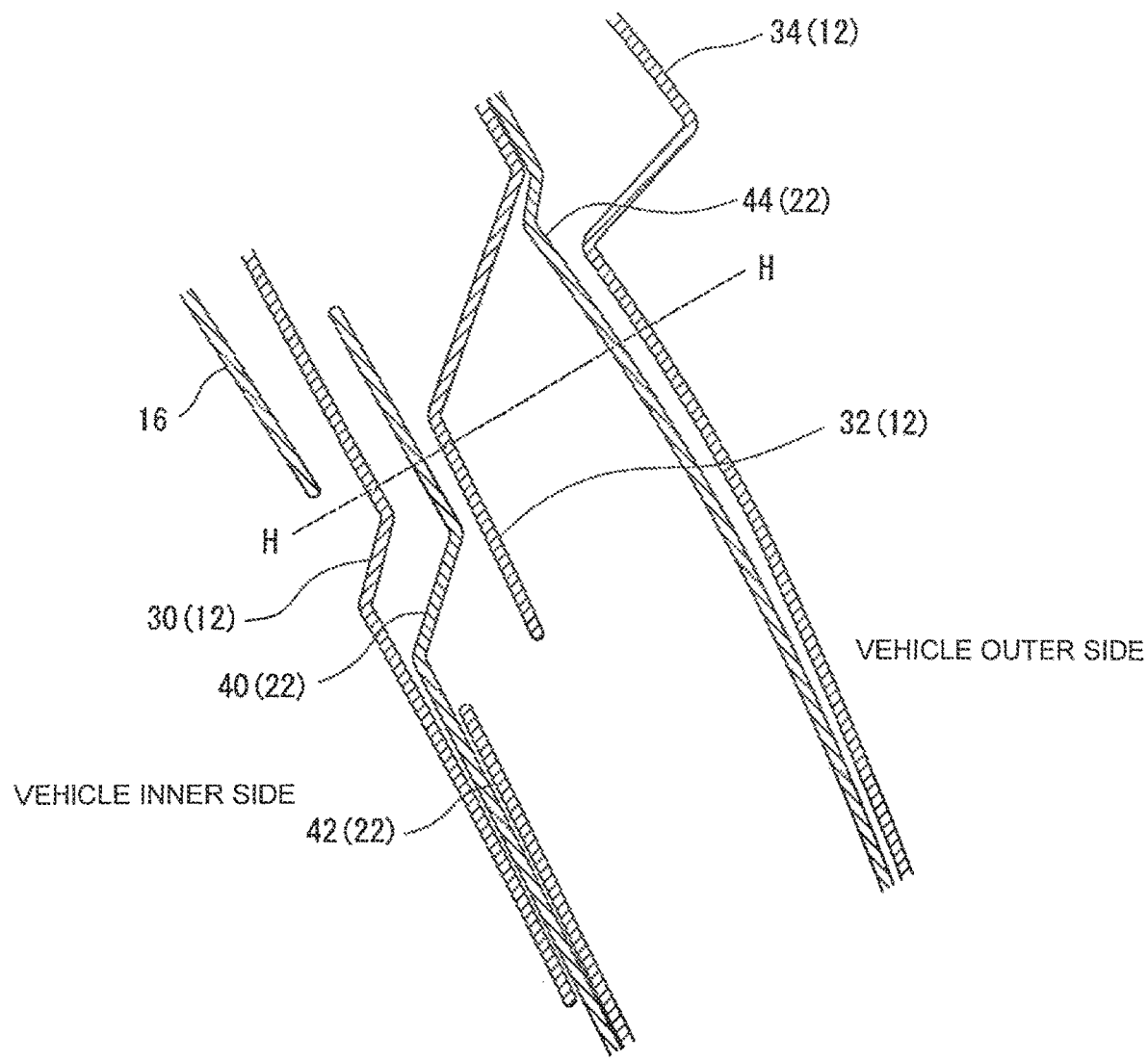
FIG. 5 is an end view that is taken along A-A in FIG. 2.
Figure 6:
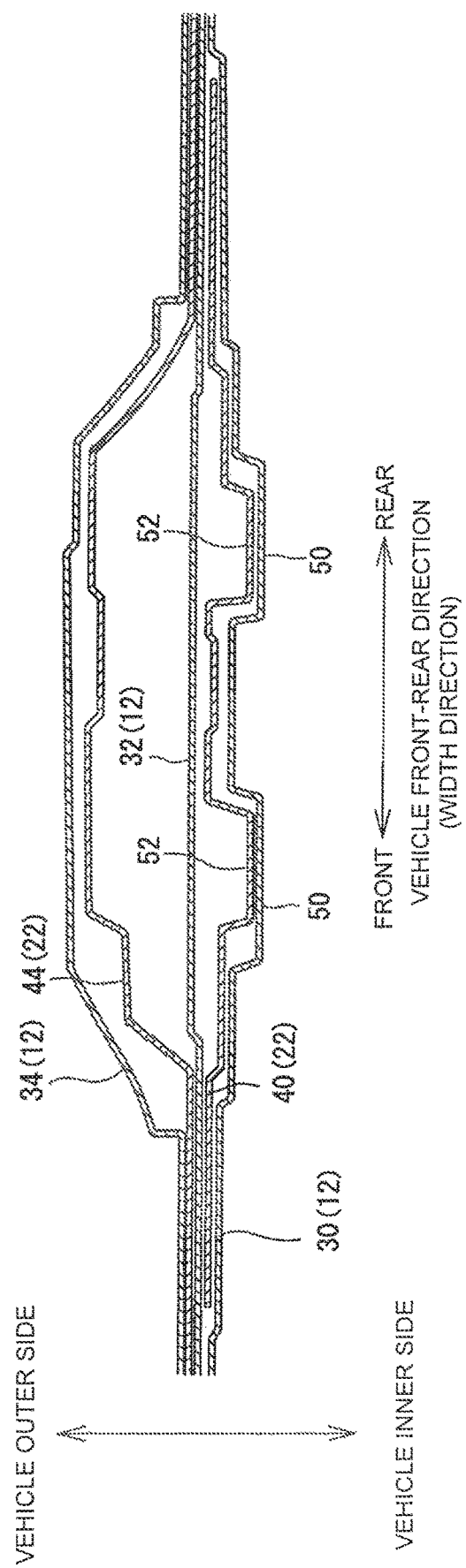
FIG. 6 is an end view that is taken along B-B in FIG. 2.
Figure 7:
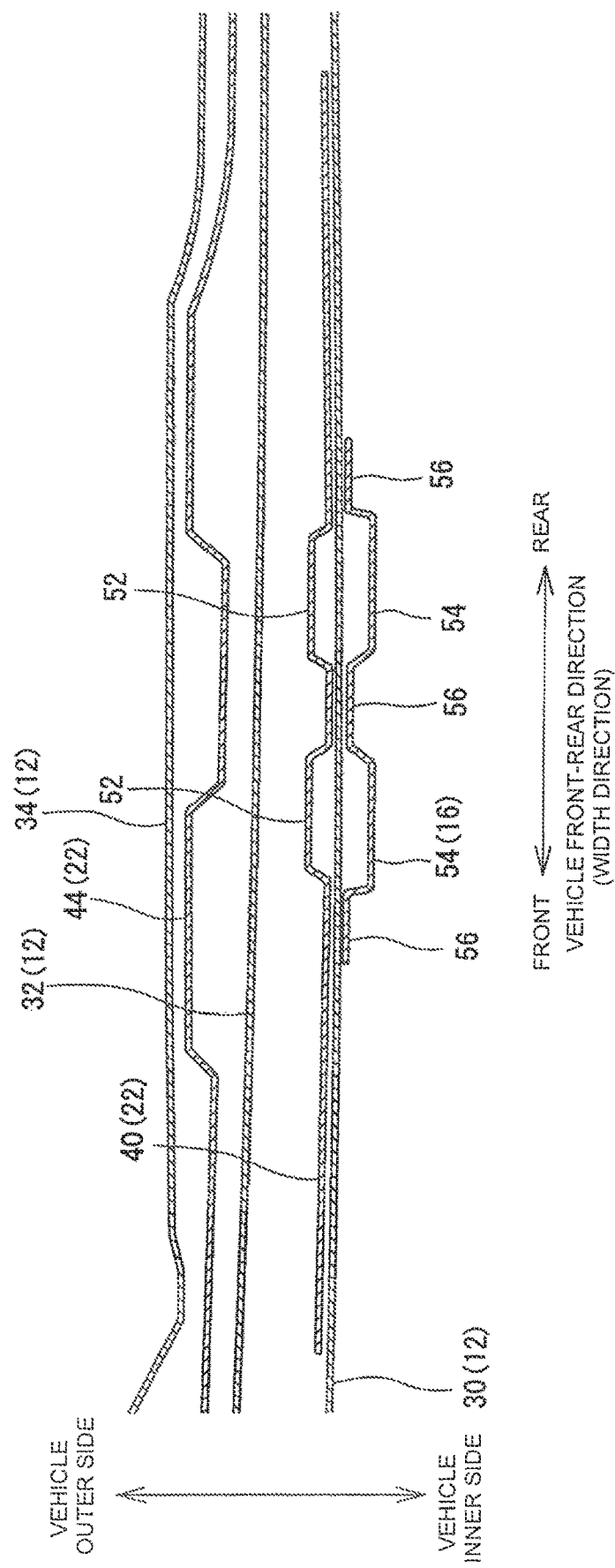
FIG. 7 is an end view that is taken along C-C in FIG. 2.

FIG. 2 is a view in which outlines of all of the sheet metal members disposed in the pillar/rail coupled portion E overlap each other. FIG. 3 and FIG. 4 are views in each of which the pillar/rail coupled portion E is seen from a vehicle inner side. However, the roof R/F gusset 16 and the rail inner 30 are removed in FIG. 4. FIG. 5 is an end view that is taken along A-A in FIG. 2. FIG. 6 is an end view that is taken along B-B in FIG. 2, and FIG. 7 is an end view that is taken along C-C in FIG. 2. Note that, in the following description, a short direction of the B pillar 22 (a vehicle front-rear direction) will be referred to as a "width direction" and a long direction of the B pillar 22 (a vehicle vertical direction) will be referred to as a "height direction".

As is apparent from FIG. 5, in an order from the vehicle inner side, the roof R/F gusset 16 that couples the roof R/F 14 and the rail 12, the rail inner 30 that constitutes an inner surface of the rail 12, the pillar inner 40 that constitutes an inner surface of the B pillar 22, a pillar inner R/F 42 that reinforces the B pillar 22, a rail outer R/F 32 that reinforces the rail 12, a pillar outer R/F 44 that reinforces the B pillar 22, and a side member outer 34 that constitutes a design surface are disposed in the pillar/rail coupled portion E. Each of these gusset 16, inners 30, 40, R/Fs 42, 32, 44, and side member outer 34 is a sheet metal member that is made of metal, and is shaped by pressing or the like. Such sheet metal members are appropriately joined by welding. Circled cross marks in FIG. 2 to FIG. 4 each represent one example of a welded part. However, the welded parts illustrated in these drawings merely constitute one example and may appropriately be changed.

As illustrated in FIG. 6 and FIG. 7, a transverse cross-section of each of the side member outer 34 and the pillar outer R/F 44 is roughly in a hat shape that is projected to a vehicle outer side and is recessed to the vehicle inner side substantially at a center thereof in the width direction. In addition, as is apparent from FIG. 6 and FIG. 7, the rail outer R/F 32 has a flat shape that does not have significant projections or recesses. The side member outer 34, the pillar outer R/F 44, and the rail outer R/F 32, as just described, can be constructed by a known technique, and thus a detailed description thereon will not be made herein.

Next, configurations of the roof R/F gusset 16, the rail inner 30, and the pillar inner 40 will be described. As is apparent from FIG. 3, FIG. 5, and the like, an upper end of the pillar inner 40 extends to an upper side from a lower end of the rail inner 30, and a lower portion of the rail inner 30 and an upper portion of the pillar inner 40 overlap each other in a thickness direction thereof.

In addition, as is apparent from FIG. 3, FIG. 5, and the like, a lower end of the roof R/F gusset 16 extends to a lower side from an upper end of the rail inner 30 and the upper end of the pillar inner 40, and a lower portion of the roof R/F gusset 16, a portion of the rail inner 30, and the upper portion of the pillar inner 40 overlap each other in the thickness direction thereof. In the following description, height which is slightly lower than height of the lower end of the roof R/F gusset 16 and at which rail beads 50, which will be described below, are no longer provided will be referred to as "reference height H".

The rail inner 30 is a sheet metal member that extends in the vehicle front-rear direction. As illustrated in FIG. 3, this rail inner 30 is projected downward at the same position as the B pillar 22 in the vehicle front-rear direction so as to increase an area of an overlapping portion with the B pillar 22. In addition, as illustrated in FIG. 6, at B-B height that is lower than the reference height H, the rail inner 30 is formed with plural projections and recesses in the width direction. More specifically, at the B-B height, the rail inner 30 is formed with two rail beads 50 with a space being interposed therebetween in the width direction. Each of these two rail beads 50 extends upward from the lower end of the rail inner 30 (see FIG. 3). As illustrated in FIG. 6, each of the rail beads 50 is projected to the vehicle inner side and is recessed to the vehicle outer side. With these rail beads 50, the rail inner 30 has plural steps (three steps in the illustrated example) such that outer portions of the rail inner 30 in the width direction are gradually projected to the vehicle outer side.

Here, as is apparent from FIG. 3, such rail beads 50 and steps are eliminated at the reference height H that is slightly lower than the lower end of the roof R/F gusset 16. Accordingly, as illustrated in FIG. 7, at C-C height at which the roof R/F gusset 16 and the rail inner 30 overlap each other, the rail inner 30 has a flat surface that hardly has the projections and the recesses in the width direction. In this way, the rail inner 30 and the roof R/F gusset 16 can be located in proximity to each other, and thus the rail inner 30 and the roof R/F gusset 16 can be joined to each other. This will be described in detail below.

The pillar inner 40 is disposed on the vehicle outer side of the rail inner 30. The pillar inner 40 is a sheet metal member that extends in the vehicle vertical direction. As is apparent from FIG. 3, the upper end of this pillar inner 40 substantially reaches the center of the rail 12 in the vertical direction. In addition, the upper end of the pillar inner 40 expands in the width direction (the vehicle front-rear direction) so as to increase an area of an overlapping portion with the rail inner 30.

As is apparent from FIG. 6, at the B-B height that is lower than the reference height H, this pillar inner 40 has such a transverse cross-sectional shape that offsets the rail inner 30 to the vehicle inner side. More specifically, the pillar inner 40 is formed with two pillar beads 52, each of which extends in the vehicle vertical direction. In an area below the reference height H, each of these two pillar beads 52 is projected to the vehicle inner side, is recessed to the vehicle outer side, and is located in the recess of the rail bead 50. The pillar inner 40 also has plural steps that are formed to gradually project toward the vehicle outer side as it goes from the pillar bead 52 toward the outer side in the width direction.

More specifically, in this example, in a portion of the pillar inner 40 that overlaps the rail inner 30 but does not overlap the roof R/F gusset 16, the pillar inner 40 has such a shape that offsets the rail inner 30 to the vehicle inner side, and each of the pillar beads 52 partially enters the recess of the rail bead 50. With such a configuration, the deep beads can be formed in the pillar inner 40 and the rail inner 30 while an increase in the thickness of the pillar/rail coupled portion E is suppressed.

That is, in the case where the positions of the pillar beads 52 and the rail beads 50 in the width direction are offset from each other, the rail inner 30 has to be offset to the vehicle inner side in comparison with the case in FIG. 6, so as to avoid interference with the pillar beads 52. As a result, the thickness of the pillar/rail coupled portion E is increased. Meanwhile, in the case where depths of the rail beads 50 and the pillar beads 52 are reduced, the increase in the thickness of the pillar/rail coupled portion E can be suppressed. However, in this case, the strength of each of the rail inner 30 and the pillar inner 40 is reduced.

Meanwhile, as in this example, in the case where each of the pillar beads 52 is located in the recess of the rail bead 50, the depths of both of the beads 50, 52 can be increased while the increase in the thickness of the pillar/rail coupled portion E is suppressed. Accordingly, the strength of both of the inners 30, 40 can be improved. In addition, the strength of both of the inners 30, 40, that is, the strength of the pillar/rail coupled portion E can be improved by forming the deep beads 50, 52 in the inners 30, 40. As a result, even when the thickness of both of the inners 30, 40 is reduced, sufficient strength against the roof crush load can be secured.

In addition, in this case, almost the entire width of the pillar inner 40 is located in proximity to the rail inner 30. Accordingly, for example, in the case where the pillar inner 40 receives the roof crush load and is flexed (bent) to the vehicle inner side, the pillar inner 40 abuts the rail inner 30 at an early stage, and thus further flexure thereof is suppressed. Furthermore, in the case where the rail inner 30 receives the roof crush load and is flexed (bent) to the vehicle inner side, the rail inner 30 abuts the pillar inner 40 at the early stage, and thus further flexure thereof is suppressed. That is, since the pillar inner 40 and the rail inner 30 are located in proximity to each other in the entire width, bending of the pillar inner 40 and the rail inner 30 is effectively suppressed, and thus the vehicle cabin can further be reliably protected.

By the way, each of the pillar beads 52 is projected to the vehicle inner side in the area below the reference height H but is projected to the vehicle outer side in an area above the reference height H. More specifically, as illustrated in FIG. 7, at the C-C height at which the pillar inner 40 and the roof R/F gusset 16 overlap each other, each of the pillar beads 52 is projected to the vehicle outer side and is recessed to the vehicle inner side. In other words, a projected/recessed direction of each of the pillar beads 52 is reversed near the reference height H. A reason why the projected/recessed direction of each of the pillar beads 52 is reversed, as just described, is to cause the pillar beads 52 to extend to the upper end of the pillar inner 40 while avoiding interference between the pillar inner 40 and the rail inner 30. This will also be described below.

The roof R/F gusset 16 is disposed on the vehicle inner side of the rail inner 30. The roof R/F gusset 16 is a sheet metal member that is connected to each of the ends of the roof R/F 14 in the width direction, and the roof R/F 14 is coupled to the rail 12 via the roof R/F gusset 16. As illustrated in FIG. 3 and FIG. 7, this roof R/F gusset 16 is formed with two roof beads 54 with a space being interposed therebetween in the width direction, and each of the roof beads 54 extends upward from the lower end of the roof R/F gusset 16. In the roof R/F gusset 16, a joined surface 56 as a flat surface without a projection and a recess exists on each side of the roof beads 54. In these joined surfaces 56, the roof R/F gusset 16 is joined to the rail inner 30 by spot welding. In order to allow joining between this roof R/F gusset 16 and the rail inner 30, the rail inner 30 has the flat surface where the rail beads 50 are eliminated in the area above the reference height H.

Here, in a case where the rail inner 30 has a flat surface in the area above the reference height H, the pillar inner 40, which is located on the vehicle outer side of the rail inner 30, cannot be provided with a bead that is projected to the vehicle inner side (the rail inner 30 side). If such a bead is provided, the rail inner 30 and the pillar inner 40 interfere with each other. Accordingly, in this example, as described above, the projected/recessed direction of each of the pillar beads 52 is reversed in an intermediate portion thereof such that each of the pillar beads 52 is projected to the vehicle inner side in the area below the reference height H and is projected to the vehicle outer side in the area above the reference height H. In this way, each of the pillar beads 52 can extend to the upper end of the pillar inner 40 while avoiding the interference between the pillar inner 40 and the rail inner 30. In addition, when each of the pillar beads 52 extends to the upper end of the pillar inner 40, the strength of the pillar inner 40 can be improved, and bending of the B pillar 22 at the time of receiving the roof crush load can effectively be prevented.

Note that, as is apparent from FIG. 3, with a portion near elimination height of the rail beads 50 (the reference height H) that is a boundary, a distance between the two pillar beads 52 is rapidly reduced on an upper side of the elimination height. In an overlapping area with the roof R/F gusset 16, the distance between the two pillar beads 52 is substantially the same as a distance between the roof beads 54. In other words, as illustrated in FIG. 7, at the C-C height at which the pillar inner 40 and the roof R/F gusset 16 overlap each other, the pillar beads 52 and the roof beads 54 almost directly oppose each other with the rail inner 30 being interposed therebetween.

As is apparent from what has been described so far, in this example, the pillar inner 40 is formed with the pillar beads 52 in such shapes that offset the rail beads 50 to the vehicle outer side so that each of the pillar beads 52 is located in the recess of the rail bead 50. With such a configuration, even when the thickness of the pillar inner 40 and the rail inner 30 is reduced, the strength of both of the inners 30, 40, that is, the strength of the pillar/rail coupled portion E can be improved. As a result, even when the thickness of both of the inners 30, 40 is reduced, sufficient strength against the roof crush load can be secured.

The description that has been described so far is merely a description of one example. As long as each of the pillar beads 52 is located in the recess of the rail bead 50, the rest of the configuration can appropriately be changed. For example, in the present specification, the pillar bead 52, the rail bead 50, and the roof bead 54 are each provided in two rows. However, each of these beads 52, 50, 54 may be provided in one row, three rows, or more. However, from a perspective of securing strength, each of these beads 52, 50, 54 is desirably provided in two or more rows. In addition, in the present specification, the pillar beads 52 and the roof beads 54 are formed in the overlapping area of the pillar inner 40 and the roof R/F gusset 16. However, one or both of the beads 52, 54 may be eliminated in the overlapping area. Furthermore, the coupled portion between the B pillar 22 and the rail 12, which is located between the front seat and the rear seat, has been described so far as the example. However, the structure disclosed in the present specification may be applied to a coupled portion between another pillar and the rail 12 as long as the pillar receives the roof crush load. For example, in the case of a large-sized vehicle, plural center pillars exist between a front pillar located at the front and a rear pillar located at the rear. In this case, the structure disclosed in the present specification may be applied to the plural center pillars except for the front pillar and the rear pillar.

The invention claimed is:

1. A body frame structure that constitutes a side and a top of a vehicle, the body frame structure comprising:
   a pillar inner that extends in a vehicle vertical direction on the side of the vehicle; and
   a rail inner that extends along a boundary line between the side and the top of the vehicle, the rail inner being disposed on a vehicle inner side of the pillar inner, wherein
   in an overlapping portion with the pillar inner, the rail inner is formed with a rail bead that extends upward in the vehicle from a lower end thereof, is projected to the vehicle inner side, and is recessed to a vehicle outer side, and
   in an overlapping portion with the rail bead, the pillar inner is formed with a pillar bead that extends in the vehicle vertical direction, the pillar bead being in such a shape that the rail bead is offset to the vehicle outer side so that the pillar bead is located in a recess of the rail bead.

2. The body frame structure according to claim 1, wherein two or more of each of the rail beads and the pillar beads are formed with a space being interposed therebetween in a vehicle front-rear direction.

3. The body frame structure according to claim 1 further comprising:
   a roof reinforcement that extends in a vehicle width direction at the top of the vehicle; and
   a roof reinforcement gusset that is joined to a longitudinal end of the roof reinforcement and that is joined to the rail inner at a position on the vehicle inner side of the rail inner, wherein
   the rail bead is eliminated at a reference height that is slightly lower than a lower end of the roof reinforcement gusset, and
   a portion of the rail inner that overlaps the roof reinforcement gusset has a flat surface without a projection and a recess.

4. The body frame structure according to claim 3, wherein a projected/recessed direction of the pillar bead is reversed in an intermediate portion thereof such that the pillar bead is projected to the vehicle outer side and recessed to the vehicle inner side in an area above the reference height and is projected to the vehicle inner side and recessed to the vehicle outer side in an area below the reference height.

5. The body frame structure according to claim 3, wherein the roof reinforcement gusset has:
   a roof bead that extends upward from the lower end of the roof reinforcement gusset, is projected to the vehicle inner side, and is recessed to the vehicle outer side; and
   a flat surface that is located on each side of the roof bead and is joined to the rail inner.

6. The body frame structure according to claim 1, wherein the pillar inner is a part of a center pillar that is located between a front seat and a rear seat.

* * * * *